No. 714,709. Patented Dec. 2, 1902.
J. P. KEANE.
FILTRATION APPARATUS FOR MUNICIPAL OR COMMERCIAL USES.
(Application filed July 28, 1902.)
(No Model.) 3 Sheets—Sheet 1.
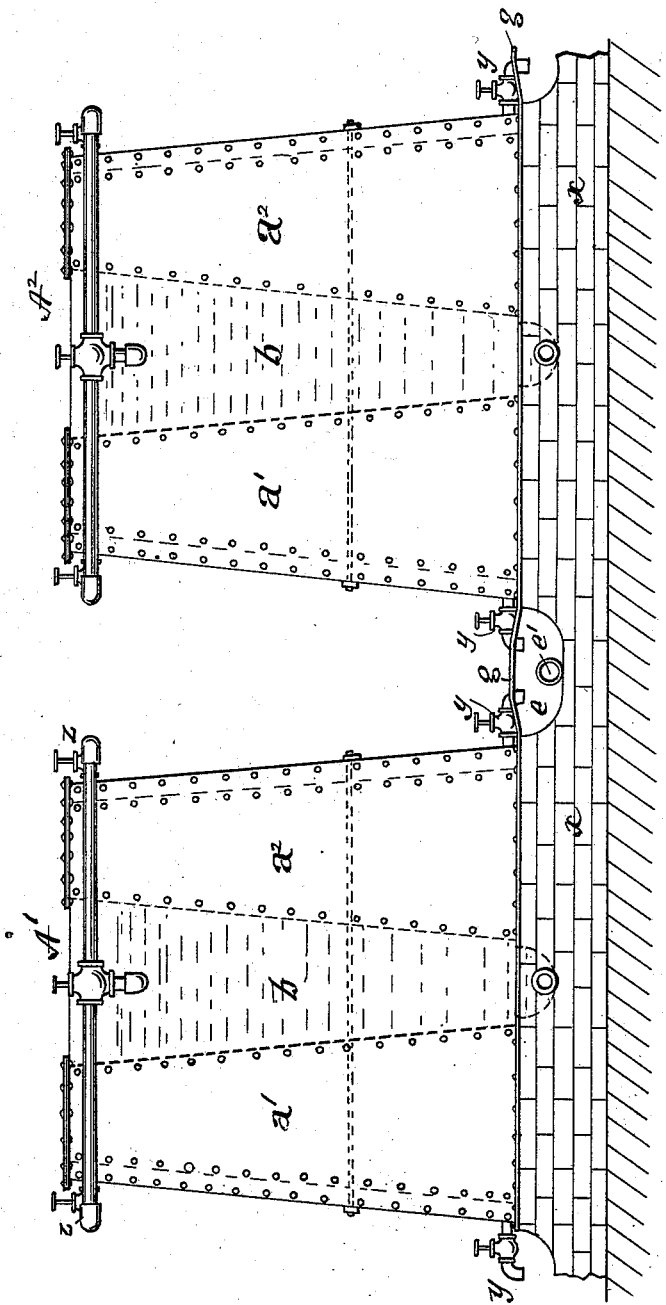
Witnesses. Inventor.

No. 714,709. Patented Dec. 2, 1902.
J. P. KEANE.
FILTRATION APPARATUS FOR MUNICIPAL OR COMMERCIAL USES.
(Application filed July 28, 1902.)
(No Model.) 3 Sheets—Sheet 2.
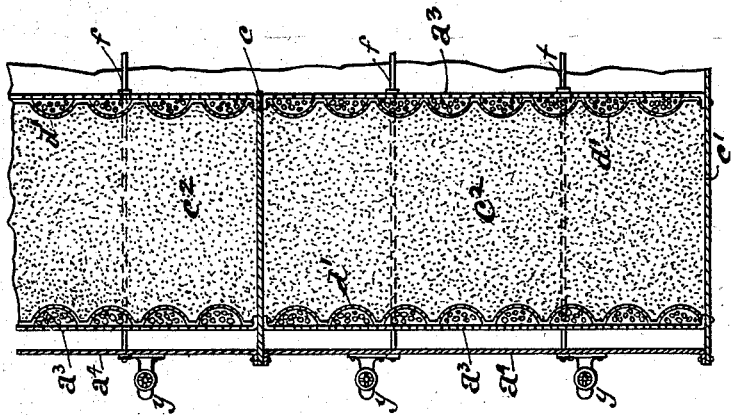
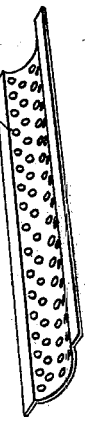
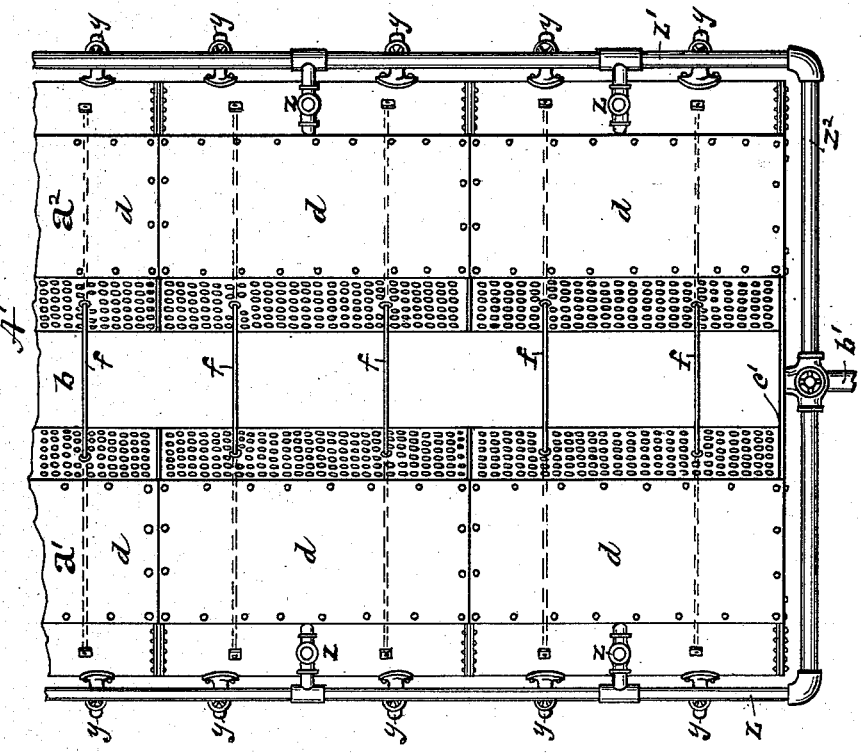
Witnesses. Inventor.

No. 714,709. Patented Dec. 2, 1902.
J. P. KEANE.
FILTRATION APPARATUS FOR MUNICIPAL OR COMMERCIAL USES.
(Application filed July 28, 1902.)
(No Model.) 3 Sheets—Sheet 3.
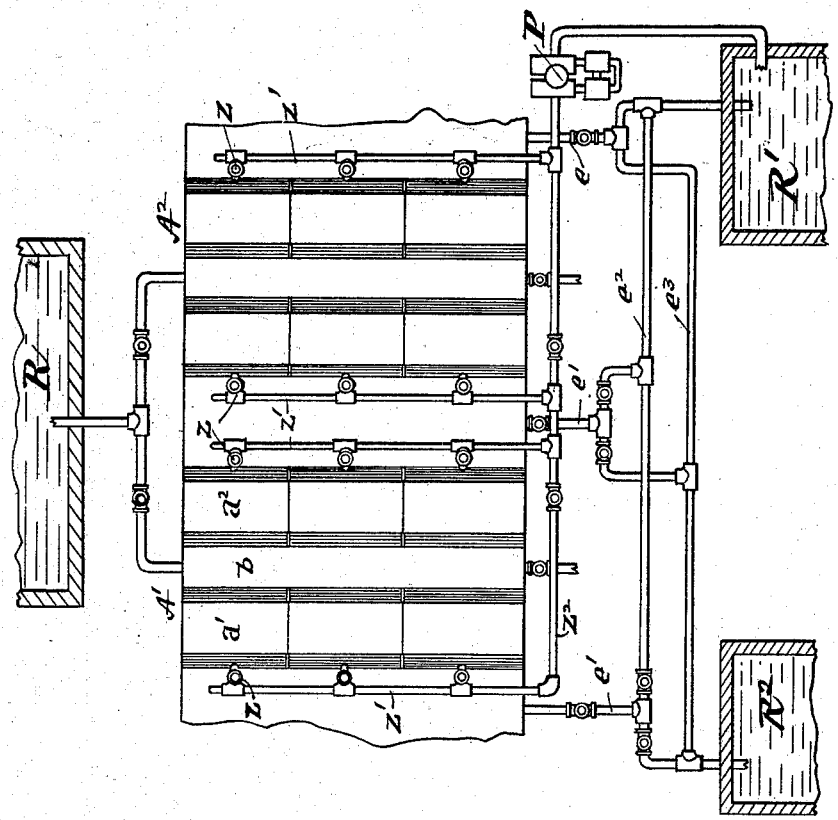
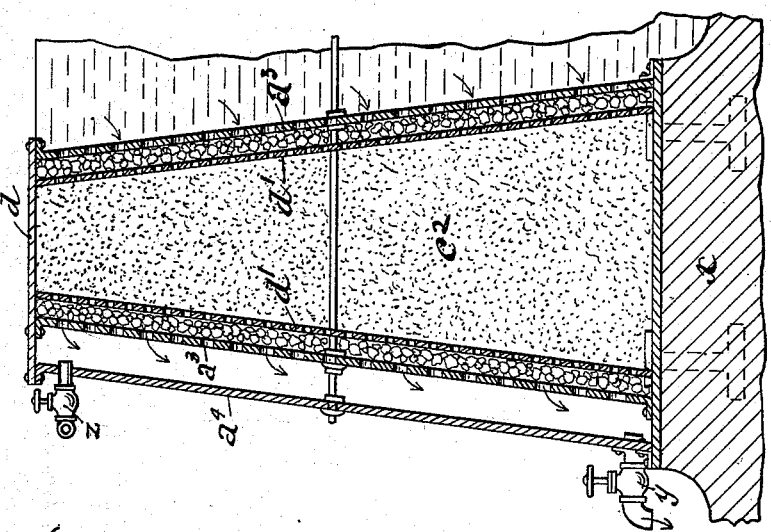

UNITED STATES PATENT OFFICE.

JAMES P. KEANE, OF CINCINNATI, OHIO, ASSIGNOR OF ONE-HALF TO EDWARD N. ROTH, OF CINCINNATI, OHIO.

FILTRATION APPARATUS FOR MUNICIPAL OR COMMERCIAL USES.

SPECIFICATION forming part of Letters Patent No. 714,709, dated December 2, 1902.

Application filed July 28, 1902. Serial No. 117,309. (No model.)

*To all whom it may concern:*

Be it known that I, JAMES P. KEANE, a citizen of the United States, residing at Cincinnati, in the county of Hamilton and State of Ohio, have invented new and useful Improvements in Filtration Apparatus for Municipal or Commercial Uses, of which the following is a specification.

My invention relates to the filtration of muddy and impure water, its object being to provide a system of apparatus for municipal or commercial uses, the primary feature of which is a filtering tank or chamber, through which water passes from a laterally-adjacent trough. Two of such tanks or chambers, with a distributing-trough between, constitute in the system of apparatus herein described a filtering "unit," and the entire apparatus embodies a series of such units arranged in laterally-adjacent relations in groups, the outside filter of each unit discharging into a service-conduit common to the nearest filter of the next adjacent unit.

The filters are peculiarly-constructed chambers built of sheet metal wholly above ground, preferably in the form of elongated truncated wedges resting upon their broader bases and converging upwardly and arranged in parallel relations, the space between the two filters of a unit being closed at the ends and forming, with the adjacent sides of the filters, a receiving and distributing trough for the filters of the unit. Both sides of each filtering-chamber are perforated to permit the water received from the intervening trough to pass outward through the filtering material of each chamber and through the outer sides, where it flows downward into the conduit for distributing to an outer reservoir for further distribution to the service-mains.

Each filter is divided by cross-partitions into independent chambers of convenient length, and the general top of the filter is closed by caps or covers corresponding with the several chambers. At the outer or discharge side of each filter is a narrow space inclosed by an extension of the cross-partitions and an imperforate outer wall, forming an auxiliary chamber, into which the clear water passes from the filters and thence outward into a conduit below through exit-cocks. These being closed upon occasion and water being forced into the auxiliary chambers under compression it passes through the filters in a reverse direction, carrying the mud and impurities back into the receiving-trough, whence it is discharged into the sewers or elsewhere.

Any number of filtering units, each unit consisting of two adjacent tanks with receiving-trough between, may be arranged side by side in multiple relation to common inlet and discharge conduits, and thus concentrate in a relatively small space apparatus having very considerable filtering capacity of such character as to be continuously operative as a whole, while the cleansing of individual units may be constantly carried on at the same time.

Further details will be presented in the course of the subjoined description in connection with the figured illustrations.

My invention is illustrated in the accompanying drawings, in which—

Figure 1 is an end elevation of two of the filtering units arranged for operation; Fig. 2, a partial plan view of one of the filtering units; Fig. 3, a plan section of one of the filters, taken about midway and showing the general construction features. Fig. 4 is a perspective view of one of the sectional screens detached; Fig. 5, a cross-sectional elevation of one of the filters; Fig. 6, a diagrammatic plan of two filtering units, showing the arrangement of pipe connections and explanatory of the general working of the apparatus.

Referring now to the drawings, A' and A² designate so-called "units" of my filtering apparatus, each embracing two main filters $a'$ $a^2$, preferably of truncated wedge form, placed side by side in parallel relations, with a space $b$ between, utilized as a receiving-trough for water to be treated. The filters $a'$ $a^2$ are tanks of sheet metal, closed at bottom, sides, ends, and top, except minute perforations through the sides and covered openings at the top for access. The space $b$ is closed at the ends to form, with the adjacent sides of the filters $a'$ $a^2$ and the common foundation structure $x$, a trough for the admission of water to be treated. The filter-tanks $a'$ $a^2$ are identical in structure and are preferably constructed as follows: Perforated side plates $a^3\ a^3$ are bolted or riveted to and between the imperforate cross-partitions $c$ and end plates $c'$. In like manner at the discharge side imperforate outer side plates $a^4$ are bolted to extensions of said side partitions and end plates and closed in at top and bottom to form auxiliary outer chambers between the partitions. The general filter is thus divided into compartments $c^2$, each having at one side its auxiliary chambers. The latter are provided at the bottom with one or more discharge-apertures, provided with governing-valves $y$, and are also provided with apertures at or near the top, provided with governing-valves $z$, the latter having pipe connections, hereinafter described.

The top of the general filter $A'\ A^2$ is closed by a number of covers $d$, one for each compartment, extending also over the corresponding auxiliary compartments. The tank-compartments are filled with any suitable material—such as sand, &c.—between the convex sides of sectional screens $d'$, placed side by side to form a minutely-perforated lining inside the main walls $a^3$, whose perforations are larger. The convex spaces at the outer sides of the screens $d'$ are filled with coarser filtering material, such as fine gravel or the like.

The units of the system of apparatus are placed side by side in parallel relations, and the discharge-streams flow into a conduit $e$ between and common to both, whence it is discharged ultimately into a clear-water reservoir for use.

The two filters $a'\ a^2$ of a filtering unit are tied together by tie-rods $f$ to resist the outward pressure of water contained in the intervening trough $b$.

Referring now to the diagrammatic plan view, Fig. 6, the series of upper valves $z$ are connected by a common branch pipe $z'$ at each side of each filter $A'\ A^2$ to a pump-main $z^2$, leading to a pump P, drawing from a clear-water reservoir. The clear-water conduits $e$ connect by pipes $e'$, branched into mains $e^2\ e^3$, all suitably governed by valves and leading to a reservoir $R'$, used for cleansing purposes, as will be hereinafter explained, and $R^2$ for final distribution and use.

The troughs $b$ have valved outlets $b'$, leading to a sewer. These troughs are normally supplied from a reservoir R with water to be filtered.

The mode of operation is as follows: Water to be filtered is supplied from a reservoir R or other source of supply to the troughs $b$, which are kept constantly full. Thence it passes outward through the adjacent tanks $a'\ a^2$, passing through the perforated sides $a^3$, screens $d$, and the contained filtering material into and through the auxiliary chambers within the shields $a^4$ and is discharged through the cocks $y$ into conduits $e$, whence it passes through outlets $e'$ and mains $e^3$ into the final reservoir $R^2$. In this passage the mud and impurities are filtered out and retained by the filtering material of the tanks. When cleansing is necessary, the supply is shut off, the tanks drained, the series of exit-cocks $y$ are all closed, (a bridge $g$, Fig. 1,) affording convenient access, and the pump P started in operation. One by one the compartments $c^2$ are subjected to the passage of water through the pipes $z^2\ z'$ and the proper cock $z$ into and through the compartment-section of the filter in reverse, the water passing outward through the normal receiving side $a^3$ into the trough $b$, whose exit is opened into the sewer. It may now be explained that the object of this dividing of the general filtering-tank into sections or separate compartments is to concentrate a strong water-pressure upon and through a limited area of the filter to agitate the filtering material, and thus facilitate the thorough cleansing. The compartments are thus successively treated until a unit is entirely cleansed. As the system when constructed for municipalities will preferably contain a number of units, one may be thus temporarily taken out of service without interfering with the use of all the rest, so that in a system containing a number of such units cleansing can go on continuously while the apparatus as a whole is performing its proper functions.

When the cleansing of a unit is completed and the connections are restored to normal working position, the first water that passes is apt to be a little "milky" and is passed through the mains $e^2$ into reservoir $R'$ as a source of pump-supply for cleansing purposes; but as soon as the water runs perfectly clear the discharge is turned through main $e^2$ into reservoir $R^2$.

I claim as my invention and desire to secure by Letters Patent of the United States—

1. A filtering-tank with perforated sides and containing suitable filtering material and adapted to filter by the passage of water laterally entirely through the same from side to side, imperforate cross-partitions dividing the tank into separate compartments, and an auxiliary side chamber for each compartment, substantially as set forth.

2. A filtering-tank with perforated sides and containing suitable filtering material and adapted to filter by the passage of water laterally entirely through the same from side to side, an outer auxiliary chamber formed by imperforate walls attached to the delivery side of the tank, and imperforate partitions extending across the tank and auxiliary chamber and dividing each into separate chambers, as and for the purpose set forth.

3. A filtering-tank with perforated sides and containing suitable filtering material said tank having imperforate cross-partitions dividing it into separate compartments, and an auxiliary side chamber for each compartment, in combination with a trough at the opposite side of the tank adapted to hold and deliver the water simultaneously over and through the entire perforated area of the receiving side, substantially as set forth.

4. A filtering-tank of upright approximately wedge form, with perforated sides and containing suitable filtering material and adapted to filter by the passage of water laterally entirely through the same from side to side, and divided by cross-partitions into adjacent compartments, and an auxiliary chamber at the side, said partitions being extended through the auxiliary chamber, substantially as set forth.

5. A filtering-tank of upright approximately wedge form, with perforated sides and containing suitable filtering material and adapted to filter by the passage of water laterally entirely through the same from side to side, and divided by cross-partitions into adjacent compartments, and an auxiliary chamber at the side, said partitions being extended through the auxiliary chambers, in combination with movable top covers corresponding with the compartments, to afford access to the main or auxiliary compartments, substantially as set forth.

6. The combination of a pair of filter-tanks having upwardly-converging sides said tanks separated from each other to form an intermediate downwardly-converging trough for containing unfiltered water, adapted to percolate through the adjacent sides of the tanks, and side chambers at the outer sides of the tanks adapted to receive filtered water.

7. In combination with a filtering-tank, divided into independent compartments and having the divided auxiliary chamber described, discharge-inlets provided with governing-valves arranged at the bottom of the auxiliary chambers, and similar valved inlets arranged at or near the top of the auxiliary chambers, a pipe-main connecting with said last-mentioned valves, and a force-pump connected with said main whereby any one of said filtering-compartments may be flushed in reverse, substantially as set forth.

8. In a system of filtering apparatus of the general character indicated the combination of two or more filtering units such as described, conduits leading from the delivery-channels of the filters in common to a final delivery-reservoir, and also to a flushing-water basin, with controlling-valves to turn the water into either as desired.

9. The combination of a tank having cross-partitions dividing it into separate compartments, auxiliary chambers at the side of the tank, and an inner perforated lining for the tank, substantially as described.

10. The combination, with a filtering-tank of the character indicated, an inner perforated lining, consisting of detachable concave perforated plates adapted to rest side by side, substantially as set forth.

In testimony whereof I have hereunto set my hand in presence of two subscribing witnesses.

JAMES P. KEANE.

Witnesses:
   CHAS. HERBERT JONES,
   JOS. R. GARDNER.